No. 825,877. PATENTED JULY 10, 1906.
P. BOUCHEROT.
DYNAMO ELECTRIC MACHINE.
APPLICATION FILED MAY 12, 1905.
2 SHEETS—SHEET 1.
Fig. 1.
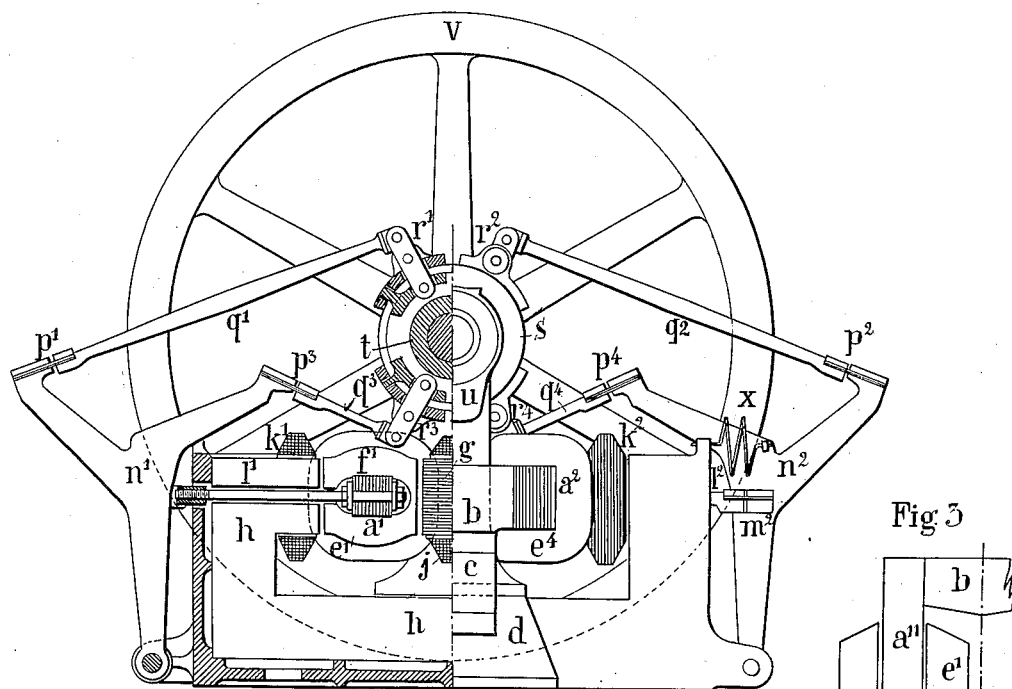
Fig. 2.
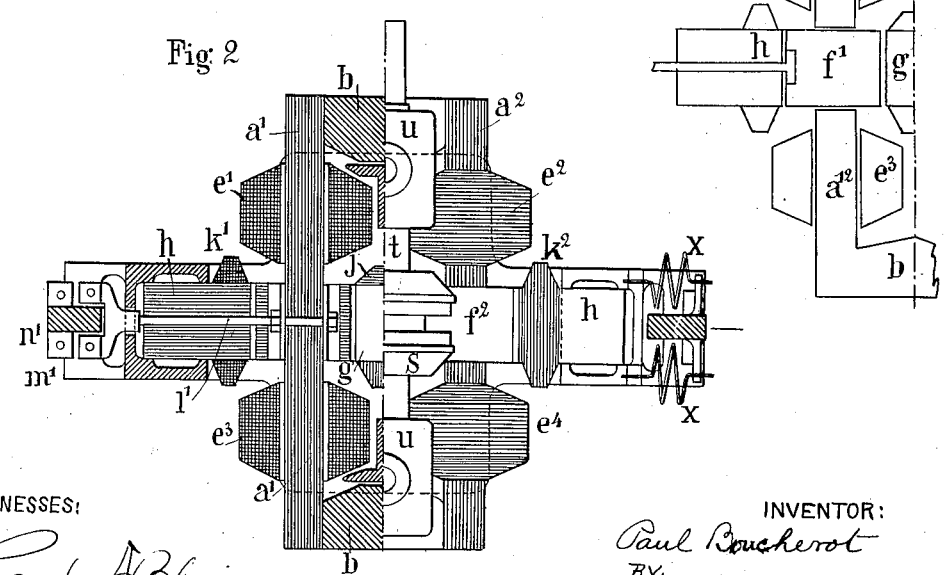
Fig. 3.
WITNESSES:
Paul A. Blair,
Walter Abbe
INVENTOR:
Paul Boucherot
BY:
Howson and Howson
ATTORNEYS.

No. 825,877. PATENTED JULY 10, 1906.
P. BOUCHEROT.
DYNAMO ELECTRIC MACHINE.
APPLICATION FILED MAY 12, 1905.

2 SHEETS—SHEET 2.

Witnesses:
Paul A. Blair.
Charles C. Abbe

Inventor:
Paul Boucherot
BY
Howson and Howson
ATTORNEYS

UNITED STATES PATENT OFFICE.

PAUL BOUCHEROT, OF PARIS, FRANCE.

DYNAMO-ELECTRIC MACHINE.

No. 825,877.   Specification of Letters Patent.   Patented July 10, 1906.

Application filed May 12, 1905. Serial No. 260,130.

*To all whom it may concern:*

Be it known that I, PAUL BOUCHEROT, engineer, a citizen of the Republic of France, residing at Paris, France, (whose post-office address is 14 Rue Daumier, Paris, France,) have invented certain new and useful Improvements in and Relating to Dynamo-Electric Machines, (for which I have obtained a patent in France, dated May 17, 1904, not yet issued; in Germany, dated June 14, 1904, not yet issued; in Belgium, dated April 21, 1905, not yet issued, and in Switzerland, dated April 20, 1905, not yet issued,) of which the following is a specification.

This invention has for its object an electrical machine which, like the greater number of electrical machines hitherto constructed, is reversible—that is to say, capable of serving for the transformation of electrical energy into mechanical energy or for the transformation of mechanical energy into electrical energy.

Owing to its special construction, the machine in accordance with this invention is more particularly capable of generating current which is wattless or in quadrature—that is to say, it may be substituted for a condenser (or for any electrical capacity) in its applications to alternating current.

Figure 4:
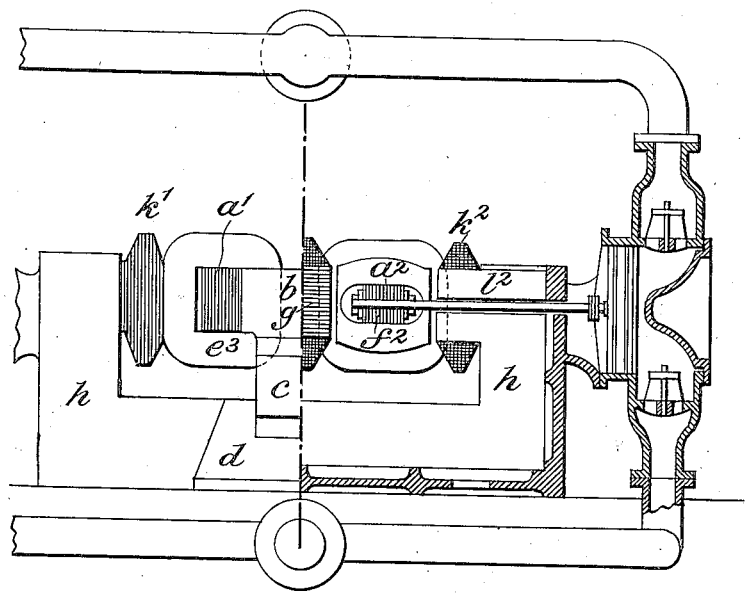
Figure 5:
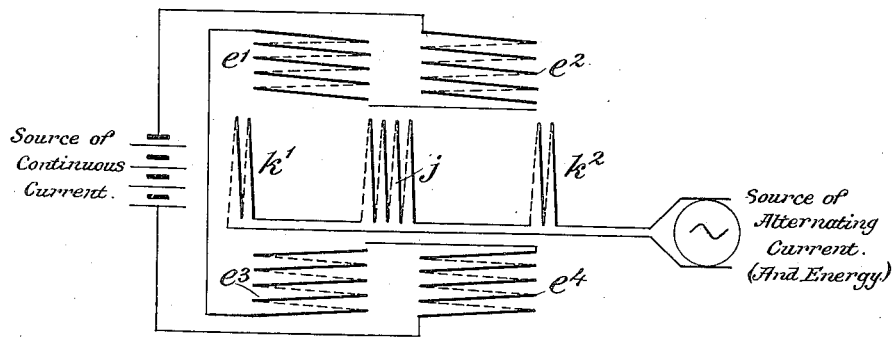

Figure 1 of the accompanying drawings is an elevation, partly in section, of a constructional form of this machine considered as an electric motor. Fig. 2 is a plan view, partly in section, partly in external elevation. Fig. 3 is a modification of one of the parts represented in Fig. 2. Fig. 4 is an elevation, partly in section, partly in external elevation, illustrating an application of the machine for driving two pumps working in parallel on the same conduit. Fig. 5 is a diagrammatic figure showing in detail the circuit connections of the coils of the continuofluxor and of the ondulafluxor in their separate circuits in connection, respectively, with sources of continuous and alternating currents.

In the first place one of the practical arrangements adapted for application to this apparatus is described in detail. In its application this arrangement is intended for the employment of the apparatus as an electric motor. The arrangement in question is represented in Figs. 1 and 2 and comprises—

First. A magnetic portion surrounded by windings through which passes continuous current coming from any convenient source of electricity. This portion, in which the flux is invariable, is hereinafter termed the "continufluxer."

Second. A magnetic portion surrounded by windings through which passes an alternating current, and from this magnetic portion is obtained the electrical energy which is transformed into reciprocating movements. This portion, in which the flux is constantly variable between two limit values, is hereinafter termed the "ondulofluxer."

Third. A mechanical device permitting of converting the reciprocating movements obtained into movements of continuous rotation.

The continufluxer, of rectangular form, is constituted as to two of its sides by flexible steel blades (magnetic spring-steel) assembled one with the other at their extremities and in the middle by means of bolts. These two bundles of blades or plates $a'$ $a^2$ are united at their extremities to blocks $b$ $b$ by means of the bolts, which likewise serve for assembling the plates one with the other. The whole is supported in space by two vertical spring-plates $c$ $c$, fixed to a framework $d$. This continufluxer is therefore capable of withstanding considerable elastic deformations and such that the middle of the spring-plates in the plan view are able to effect oscillations of an amplitude of several millimeters or even of several centimeters, if necessary. Four magnetizing-coils $e'$ $e^2$ $e^3$ $e^4$, of insulated copper wire traversed by the continuous current, appropriately wound and connected, develop consequent poles in the middle of the bundles of plates $a'$ and $a^2$, the pole developed in the middle of $a'$ being of contrary sign to that of the pole developed in the middle of $a^2$. The two magnetic fluxes thus created then pass into the ondulofluxer. To this end in the middle of each of the bundles of plates $a'$ and $a^2$ is fixed in any appropriate manner a laminated pole-piece—that is to say, a pole-piece constituted by thin insulated plates $f'$ as regards the bundle $a'$ and $f^2$ as regards the bundle $a^2$. Upon each side of both of these pole-pieces the lines of force emerge. Those from $f'$ are able to join those from $f^2$ in two ways—either by passing through the part $g$ of the ondulofluxer or by passing through the part $h$ of this ondulofluxer of appropriate form. Each of these parts of the ondulofluxer is constituted by thin plates insulated one from the other and assembled and arranged in any appropriate manner. The part $g$ is surrounded by a coil $j$, of insulated copper wire. The part $h$ for greater convenience receives two coils $k'$ and $k^2$, arranged upon the prolongation of the lateral arms. The coils $j$, $k'$, and $k^2$ may be connected either in series or in parallel and all receive alternating currents. By this is meant that the alternating current comes from the source of energy when they are in series and from branches of this circuit when they are in parallel. The diagram Fig. 5 shows the connections with the sources of continuous current and of alternating current and the different coils in the case where the series connection is adopted throughout. Under the influence of these currents the poles $f'$ and $f^2$ are alternately attracted and repelled. The connections being suitably established, $f'$ is attracted by $k'$ and repelled by $j$, while $f^2$ is attracted by $k^2$ and repelled by $j$. The variable forces acting upon $f'$ and $f^2$ are symmetrical. $f'$ and $f^2$ separate from or approach the center of the machine simultaneously. During these reciprocating movements of the parts $f'$ and $f^2$ the air-gaps on each side of these poles vary, thereby producing variations of flux in the two parts $g$ and $h$ of the ondulofluxer. When the poles are quite brought together, the flux produced by the continufluxer passes almost entirely through the part $h$ of the ondulofluxer. The flux is thus maximum in $g$ when it is minimum in $h$, and vice versa. These variations of flux in the coils $j$ $k'$ $k^2$ induce electromotive forces therein, whence production of work in this alternating movement, and this work may be utilized in any desired manner; but the movement which is produced results in part from the concurrence of another cirumstance—the elastic force of the plates of the continufluxer, which partially or wholly destroys the effects of the inertia of the parts in reciprocating movement. In fact, it is possible to conceive that the poles $f'$ and $f^2$ are released from any elastic connection, as in Fig. 3, which is but a modification of a part of Fig. 2. In this case the spring-plates corresponding to one pole $f'$ are replaced by two massive parts $a^{11}$ and $a^{12}$, each cast with the corresponding end piece $b$ and between which the pole $f'$ is able to move freely, guided in this movement only in such a manner that it is unable to rub upon $a^{11}$ and $a^{12}$. This arrangement, which may be employed without elasticity in certain cases, generally speaking, presents the following defects: The poles $f'$ and $f^2$ are able to adhere either to $g$ or to $h$. There is no median position determined by the oscillations of the poles. The forces of inertia being large, a portion of the efforts produced is employed for compensating them to the detriment of the effective power. The maximum mechanical power which can be obtained is therefore reduced by this amount.

The displacement between the current absorbed and the difference of potential at the terminals is also greater, which is not, generally speaking, desirable. It is absolutely necessary if it is desired to obtain a motor the power factor of which (cosine $\alpha$) is equal to unity to combine elasticity with the system by connecting $f'$, Fig. 3, to fixed points by means of springs.

Returning to the principal arrangement illustrated in Figs. 1 and 2, it remains to examine in what manner the two alternating movements produced are converted into continuous circular movement. With this object two transmission-rods $l'$ and $l^2$ control by the intermediary of flexible connections $m'$ and $m^2$ two levers $n'$ and $n^2$, which transmit the amplified alternating movement to four connecting-rods $q'$ $q^2$ $q^3$ $q^4$ by the intermediary of four flexible connections $p'$ $p^2$ $p^3$ $p^4$. The four connecting-rods in alternating movement control four connecting-lugs $r'$ $r^2$ $r^3$ $r^4$ and by their thrust communicate a continuous movement to a wheel $s$, keyed upon the shaft $t$, supported by the bearings $u$ $u$, and itself carrying the fly-wheel pulley $v$, from which the movement is then transmitted, by means of a belt, to any desired utilization machine or apparatus. The small springs $x$, which connect the levers $n'$ $n^2$ to the box containing the lower ondulofluxer $h$, are merely intended to partially or wholly compensate for the efforts of inertia peculiar to the levers $n'$ and $n^2$ and to the connecting-rods $q'$ $q^2$ $q^3$ $q^4$ in order to prevent the transmission of these efforts of inertia by the rods $l'$ and $l^2$. The inertia of the connecting-lugs or of any other reciprocating parts may likewise be compensated for by additional springs.

All the masses being symmetrically arranged and all the reciprocating movements being symmetrical relatively to a vertical plane passing through the axis of the shaft, the center of gravity of the system does not move and the reactions upon the supports cancel. The reactions due to the transmission of the useful work are likewise symmetrical, and these useful efforts are obtained in each of the semiperiods of the reciprocating movement.

The angle described by the fly-wheel pulley during one period of the reciprocating movement is obviously proportionate to the amplitude of this movement. Assuming the frequency to be constant, it follows that the angular velocity of the pulley is proportionate to the amplitude of the reciprocating movement. The formula of the angular velocity obtained is in reality exceedingly complex. This velocity depends both upon the alternating tension applied at the terminals of the coils of the alternating circuit, upon the value of the resisting couple, upon the excitation of the continuous current, upon the elasticity of the springs, and upon the masses in reciprocating movement. The only facts that it is important to bear in mind here are the following: The velocity for any load whatever may be varied between very wide limits—zero and maximum—either by the alternating tension applied or by the continuous excitation. The angle of lead of the alternating current absorbed by the difference of potential at the terminals may be varied between wide limits either by the excitation or by the elasticity of the springs or by the magnitude of the masses in movement.

The form of the machine described above may be modified according to circumstances. A few of the applications connected with particular cases are indicated below. In the first place applications exist for which there is no need to transform the reciprocating movement obtained into continuous circular movement. Under this category come, for example, the application to piston-pumps, drills, hammers, pile-drivers, and graving-tools, &c. Fig. 4 illustrates the application to two pumps operating in parallel upon one and the same conduit. In this figure, which is of itself exceedingly clear, the greater number of the reference-letters given above are reproduced.

In the arrangements described above the springs are utilized for the passage of the constant magnetic flux, which becomes divided into two variable fluxes. This is not indispensable, however, as, on the one hand, a continufluxer, fixed or movable relatively to the poles, may be provided, and, on the other hand, springs which are not utilized for the passage of the flux.

Like every electric machine, my apparatus is reversible and can be employed as a generator of current whether the motion of some rotary motor be converted into reciprocating motion or a reciprocating motor be applied directly. For example, the ends of each of the rods $l'$ $l'$ may be connected to a piston of a steam, gas, or other motor, which, under the action of the fluid employed, will give the necessary reciprocating motion for the production of alternating current, instead of being connected to the pump, as shown in Fig. 4.

It is well known to those skilled in the art that after having brought an alternating or synchronous motor connected in parallel with the circuit to the speed of sychronism it continues to turn, and if it is sufficiently excited delivers into the circuit a wattless current. It is the same with my apparatus, with the difference that it does not require an external means to start it. With these proportions and suitable excitation it suffices to connect it up with the circuit, as before explained, to make it oscillate and deliver to the circuit a wattless current.

I claim as my invention—

1. An electrical machine having a plurality of magnetic poles and means for imparting to them symmetrical reciprocating movements in the same direction as the lines of force that they emit, said reciprocating means comprising magnetic poles with coils at right angles to the first set, and separate circuits for each set, the reciprocating movements of the first set serving to cause the passage of a constant magnetic flux alternately in one magnetic circuit and then in the other, these circuits being consequently the seat of variable fluxes, through windings suitably arranged and traversed by alternating currents.

2. An electrical machine having a plurality of electromagnets traversed by a continuous current, and means for imparting to the poles of said magnets symmetrical reciprocating movements, said means comprising electromagnets at right angles to said first set of magnets and a separate circuit therefor, in combination with means for utilizing the reciprocating movements of the magnetic poles.

In testimony whereof I have signed my name to this specification in the presence of two subscribing witnesses.

PAUL BOUCHEROT.

Witnesses:
 LÉON FRANCKEN,
 MAURICE PELLIERER.